United States Patent Office 3,660,495

Patented May 2, 1972

1

3,660,495

PROCESS FOR PREPARING HYDROXYMETHYLATED PHOSPHINES

Kingso Chingtsung Lin, Newark, Ohio, assignor to Hooker Chemical Corporation, Niagara Falls, N.Y.

No Drawing. Filed Dec. 10, 1969, Ser. No. 883,990
Int. Cl. C07f 9/02
U.S. Cl. 260—606.5 P 7 Claims

ABSTRACT OF THE DISCLOSURE

Primary and secondary phosphines as well as phosphine itself react with formaldehyde to produce hydroxymethylated tertiary phosphines at a temperature between about 20–130° C. at about atmospheric to slightly elevated pressures. The reaction procedes smoothly to afford a product of excellent purity in nearly quantitative yields.

BACKGROUND OF THE INVENTION

Trishydroxymethyl phosphine has been produced in the past by the reaction of formaldehyde with phosphine in the presence of metal salts of the Group II and VIII metals of the Periodic Table (U.S. 3,030,421). Furthermore, it has been demonstrated that in the absence of a catalyst, formaldehyde reacts with phosphine under a pressure of 150 to 300 millimeters mercury at 40 to 80° C. to produce tetrahydroxymethyl phosphonium hydroxide in about an 80 percent yield (Raver et al., Zh. Ob. Khim., vol. 32, No. 2, pp. 558–590, 1962).

BRIEF DESCRIPTION OF THE INVENTION

It has now been discovered that the reaction of formaldehyde, in its monomeric, trimeric (trioxane) or polymeric (paraformaldehyde) form reacts readily with $PH_3$, $RPH_2$ and $R_2PH$ where R is alkyl of 1 to 18 carbon atoms, cycloalkyl of 5 to 18 carbon atoms, aryl of 6 to 18 carbon atoms, and their hydroxy, lower alkoxy, lower alkylmercapto, lower alkylamino, and lower carboalkoxy derivatives thereof, in the absence of a catalyst and under a pressure of from 1–10 atmospheres at a temperature from about 20 to about 100° C. to produce the corresponding hydroxymethylated phosphine derivative $(HOCH_2)_3P$, $RP(CH_2OH)_2$ and $R_2PCH_2OH$ in near theoretical yields. The non-catalyzed production of hydroxymethylated phosphine derivatives is especially surprising in view of the fact that the prior art generally teaches the necessity of employing HCl or a metal salt catalyst in the reaction of formaldehyde with phosphine or, where catalysts have been avoided, the product obtained has been the tetrakis-hydroxymethyl phosphonium hydroxide salt.

The present discovery affords the art a simple, direct route to hydroxymethylated phosphines without the necessity of complicated process steps for catalyst removal, product conversion to the desired phosphine derivative, and relatively strenuous process conditions of temperature and/or pressure while still producing nearly quantitative yields of the desired product. One of the disadvantages attending the use of metal salt catalysts such as $H_2PtCl_6$ resides in the production of a light yellow colored impure product.

DETAILED DESCRIPTION OF THE INVENTION

In accordance with this invention there is provided a process for the production of a hydroxymethylated phosphine which comprises reacting formaldehyde with a phosphine of the formula:

$$R_nPH_{3-n}$$

2 wherein R is a member selected from the group consisting of alkyl of 1–18 carbon atoms, cycloalkyl of 5–18 carbon atoms, aryl of 6 to 18 carbon atoms and their hydroxy, lower alkoxy, lower alkylmercapto, lower alkylamino, and lower carboalkoxy derivatives and *n* is an integer from 0–2, under a pressure of from about 1–10 atmospheres at a temperature of from about 20–100° C. for a period of time sufficient to substantially complete the reaction and thereafter increasing the temperature of the reaction mixture to from about 100–130° C. in vacuo to remove water and residual unreacted formaldehyde.

In a preferred embodiment, the temperature of reaction is between about 65–100° C. and the pressure is from 1 to 5 atmospheres.

When working with phosphine itself, no extraneous solvent is needed to assist in the reaction. The use of formaldehyde as a 37 percent aqueous solution provides a solvent for the formaldehyde. However, when performing the reaction with substituted phosphines, it is desirable to employ a solvent. The solvent must be inert toward the reactants and under the conditions of the reaction. Illustrative examples of inert solvents are pentane, hexane, heptane, octane, benzene, toluene, cyclohexane, tetrahydrofuran, and the like.

The rate of reaction of a phosphine with aqueous formaldehyde may be increased by the addition of a small amount of a tetraalkylphosphonium salt such as tetrakis-hydroxymethyl phosphonium chloride if desired. However, where a very pure product is desired, the introduction of a catalyst may be completely avoided in conformity with the instant invention.

Examples of various phosphine reactants applicable to the process of this invention are: phosphine and the mono- or disubstituted phosphine derivatives in which the substituent is alkyl (methyl, ethyl propyl, iso-propyl, butyl, octadecyl, and the like); hydroxyalkyl (2-hydroxyethyl, 2-hydroxy propyl, and the like); aryl (phenyl, 4-hydroxyphenyl, naphthyl, 4-tolyl, 4-ethylphenyl, 2,4,5-trimethylphenyl, 4 - phenylmethylphenyl, 4 - phenethylphenyl, 4 - methoxyphenyl, 4 - ethylmercapto - phenyl, 4 - carbethoxyphenyl, 4 - methylaminophenyl, 4 - diethylaminophenyl, and the like); and cycloalkyl (cyclopentyl, cyclohexyl, 2,4,6 - tri - methyl - cyclohexyl, hexa hydro-naphthyl, and the like).

Example I

One hundred grams of 37 percent aqueous formaldehyde in a 250 milliliter Parr shaker bottle was charged with $PH_3$ from a 4 liter cylinder at 50 pounds per square inch gauge and heated to 65–70° C. with vigorous shaking. The pressure dropped to 45 pounds per square inch guage in 20 minutes. The cylinder was repressurized with $PH_3$ to 50 pounds per square inch gauge and the reaction repeated in two successive steps, to give a total of 15 pounds per square inch gauge drop in pressure over a total period of 1.5 hours of heating and shaking. A total of 6.1 grams of $PH_3$ had been consumed. The resulting clear solution was transferred to a 250 milliliter flask and water and unreacted formaldehyde was stripped off in a rotary evaporator on a steam bath under 22.24 millimeters mercury pressure for one hour and for an additional hour at 2–3 millimeters mercury pressure.

The colorless viscous liquid residue was cooled to room temperature and crystallized by seeding with pure trishydroxymethylphosphine crystals to give 27 grams (55.0% conversion based on formaldehyde and greater than 100% conversion based on the $PH_3$ used) of product of melting point 54–57° C.

The chemical shift of the phosphorus-31 nuclear magnetic resonance spectrum was 24.1 p.p.m. (singlet) indicating that the compound was tris-hydroxymethylphosphine.

*Elemental analysis.*—Calculated for $C_3H_9PO_3$ (percent): P, 25.00. Found (percent): P, 24.70.

Example II

This example illustrates a series of experiments in which aqueous formaldehyde was reacted with phosphine under various pressures, temperatures and in the presence of various catalysts. The reactions conducted under pressure were performed in a Parr shake bottle placed under pressure from a 4 liter cylinder of phosphine at 50 pounds per square inch gauge. It should be noted that the rate of reaction of phosphine with formaldehyde increases with a temperature increase. Furthermore, the most pure product form of tris-hydroxymethyl phosphine was produced in the absence of a catalyst as shown by Runs 7 and 8.

The infra-red spectrum of the crude product was 3300 (indicating the presence of an associated —OH bond), 2900, 2750, 1460, 1380 (indicating CH, $CH_2$ and $CH_3$ bands) and 1015 reciprocal centimeters ($CH_2$—O bond). The phosphorus -31 nuclear magnetic resonance spectrum indicated the presence of a pure tertiary phosphine with a chemical shift of 27.6 p.p.m. (with a reference of 85 percent $H_3PO_4$).

*Elemental analysis.*—Calculated for $C_{25}H_{53}OP$ (percent): C, 74.94; H, 13.33; P, 7.74. Found (percent): C, 75.07; H, 13.37; P, 7.63.

By substituting various primary and secondary phosphines for the didodecyl phosphine of Example IV, similar results are obtained. The reaction in each case procedes smoothly to afford excellent yields of high purity product.

TABLE I

| Run | $CH_2O$ (mole) | P[a] $PH_3$ (p.s.i.g.) | $PH_3$ (mole) | Temp. (° C.) | Catalyst (g.) | Time (hrs.) | $(HOCH_2)_3P$ (mole) | Conv. based on— $CH_2O$ (percent) | Conv. based on— $PH_3$ (percent) | Anal., calcd for p, 25.00; found (percent) |
|---|---|---|---|---|---|---|---|---|---|---|
| 1 | 1.23 | 50-33 | 0.2 | 25 | Raney Ni (1.0) | 9 | 0.266 | 65 | >100 | 22.00 |
| 2 | 1.23 | 50-33 | 0.2 | 25 | No | 11 | 0.271 | 66 | >100 | |
| 3 | 1.23 | 50-25 | 0.294 | 25 | $H_2PtCl_6 \cdot 6H_2O$ (0.4) | 1.5 | 0.32 | 78 | >100 | 21.00 |
| 4 | 1.23 | 50-33 | 0.2 | 60 | 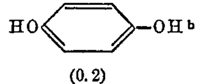 HO—C₆H₄—OH[b] (0.2) | 2.0 | 0.25 | 60 | >100 | 20.90 |
| 5 | 1.23 | 50-33 | 0.2 | 25 | $Ni(CO)_4$ (0.4) | 9 | 0.27 | 65.5 | >100 | |
| 6 | 1.23 | 50-36 | 0.16 | 65 | No | 1.0 | 0.22 | 53.0 | >100 | |
| 7 | 1.23 | 50-45 | 0.175 | 65-70 | No | 1.5 | 0.2 | 49.0 | >100 | 24.7 |
| 8 | 1.85 | 50-45 | 0.21 | 68 | No | 1.5 | 0.24 | 41.0 | >100 | 24.7 |
| 9 | 2.46 | Atm. | 0.69 | 25 | $H_2PtCl_6 \cdot 6H_2O$ (0.4) | 3.0 | 0.69 | 84.0 | >100 | 20.9 |
| 10 | 1.85 | Atm. | ≈0.25 | 65 | No | 3.0 | 0.175 | 42.5 | 70 | |

[a] Pressure reading of 4 liter cylinder.
[b] The presence of hydroquinone improved the color of the product.

Example III

To demonstrate the effect of acid catalysis and the use of tetrakis-hydroxymethyl phosphonium chloride in the reaction of phosphine with formaldehyde, the following experiments were performed. It may be noted that excellent yields of THP (tris-hydroxymethyl phosphine) were obtained in the absence of an acid catalyst (Run 3) and in the presence of HCl or THPC (tetrakis-hydroxymethyl phosphonium chloride) with very small amounts of by-product formation. Each of the tabulated runs were carried out in a Parr shaker bottle pressurized with phosphine from a 4 liter cylinder.

For example, two similar runs of the above reaction were carried out but mono-octyl- and dioctylphosphine were used.

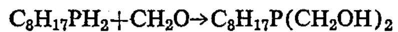

$$C_8H_{17}PH_2 + CH_2O \rightarrow C_8H_{17}P(CH_2OH)_2$$

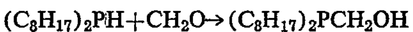

$$(C_8H_{17})_2PH + CH_2O \rightarrow (C_8H_{17})_2PCH_2OH$$

Both runs gave similar results as the previous runs. The infra-red spectra of these two products were identical in the shape of their absorption bands with didodecyl hydroxymethyl-phosphine. These three alkylhydroxymethyl phosphine derivatives were oxidized by hydrogen peroxide in acetone to give the corresponding phosphine oxides. From the study of infra-red spectra of these oxides, which are summarized in the following table, it is evident that the structure of the hydroxymethylphosphine oxides exhibited intermolecular hydrogen bonding as shown in the following:

| Run | HX (mole) | $H_2O$ (mole) | $PH_3$ (p.s.i.g.) | Temp. (° C.) | Time (min.) | THP percent | THPX | $CH_3P(=O)(CH_2OH)_2$ | |
|---|---|---|---|---|---|---|---|---|---|
| 1 | 1.0 | 1.0 | 60-40 | 80-90 | 30 | 56 | (—44%—) | | HX=HCOOH |
| 2 | 0.23 | 1.2 | 60-40 | 80-90 | 45 | 72.5 | 18 | 10 | HX=HCOOH |
| 3 | 0 | 1.8 | 60-40 | 80-90 | 120 | 95 | | 5 | |
| 4 | 0.19 | 2.0 | 60-40 | 80-90 | 30 | 66.0 | 17 | 17 | HX=HCOOH |
| 5 | [1] 4 | 2.0 | 60-40 | 80-90 | 30 | 94.4 | | | HX=THPC |
| 6 | 0.024 | 2.0 | 60-40 | 80-90 | 30 | 94.3 | | | HX=HCl |

[1] Grams.

Example IV

A reaction mixture of 37.0 g. (0.1 mole) of didodecylphosphine and 60 ml. (0.6 mole) of 37 percent aqueous formaldehyde in 300 milliliters of tetrahydrofuran was refluxed for 1.5 hours. After heating, the reaction mixture was heated on a steam bath under reduced pressure of a water aspirator and latter by a vacuum pump to remove the solvent and unreacted formaldehyde. Heating on the steam bath was continued at a pressure of from 0.25 to 1.0 millimeter mercury until a reaction product of constant weight was obtained. The crude product weight 41.0 grams (100 percent conversion based on didodecylphosphine used).

P=O absorption band, 1180–1260 cm.$^{-1}$, decreased to the range of 1135–155 cm.$^{-1}$.

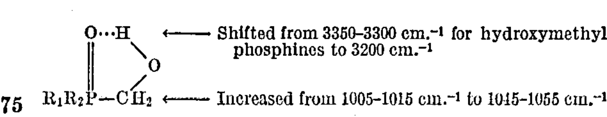

INFRA-RED ABSORPTION BAND IN CM.$^{-2}$

| $(C_{12}H_{25})_2P(=O)CH_2OH$ | $(C_8H_{17})_2P(=O)CH_2OH$ | $C_8H_{17}P(=O)(CH_2OH)_2$ | $(HOCH_2)P(=O)CH_3$ |
|---|---|---|---|
| 3,200 | 3,200 | 3,225 (a broad s band) | 3,250 (s broad). |
| 2,900 | 2,900 | 2,900 | 2,900. |
| 2,830 | 2,830 | 2,830 | 2,830. |
| 1,465 ms | 1,465 ms | 1,465 ms | 1,430 w. |
| 1,380 | 1,380 | 1,380 | 1,380. |
| 1,210 | 1,145 broad s | 1,135 broad s | 1,160 broad s. |
| 1,055 | 1,055 | 1,045 | 1,050. |

What is claimed is:

1. A process for the production of a hydroxymethylated phosphine which comprises reacting, in the presence of a catalytic amount of a tetraalkyl phosphonium salt, formaldehyde with a phosphine of the formula $$R_nPH_{3-n}$$

wherein R is a member selected from the group consisting of alkyl of 1–18 carbon atoms, cycloalkyl of 5–18 carbon atoms, aryl of 6–18 carbon atoms and their hydroxy, lower alkoxy, lower alkylmercapto, lower alkylamino, and lower carboalkoxy derivatives and *n* is an integer from 0–2, under a pressure of from about 1–10 atmospheres at a temperature of from about 20–100° C. for a period of time sufficient to substantially complete the reaction and thereafter increasing the temperature of the reaction mixture to from about 100–130° C. in vacuo to remove water and residual unreacted formaldehyde.

2. The process of claim 1 in which the temperature of reaction is between about 65–100° C.

3. The process of claim 1 in which the pressure is between about atmospheric to about 5 atmospheres.

4. The process of claim 1 in which *n* is 0.

5. The process of claim 1 in which *n* is 2.

6. The process of claim 1 in which the reaction is conducted in the presence of an inert solvent.

7. The process of claim 1 in which said tetraalkyl phosphonium salt is tetrakis-hydroxymethyl phosphonium chloride.

References Cited

UNITED STATES PATENTS

| | | | |
|---|---|---|---|
| 2,957,931 | 10/1960 | Hamilton et al. | 260—606.5 |
| 3,117,165 | 1/1964 | Epstein | 260—606.5 |
| 3,242,217 | 3/1966 | Hammann et al. | 260—606.5 |
| 3,257,460 | 6/1966 | Gordon et al. | 260—606.5 |
| 3,291,840 | 12/1966 | Buckler et al. | 260—606.5 |
| 3,293,302 | 12/1966 | Popoff et al. | 260—606.5 |
| 3,346,647 | 10/1967 | Gannett | 260—606.5 |

OTHER REFERENCES

Houben-Weyl, Methoden der Organischen Chemie (1963), vol. 12/1, p. 29.

TOBIAS E. LEVOW, Primary Examiner

W. F. W. BELLAMY, Assistant Examiner